Patented Oct. 13, 1936

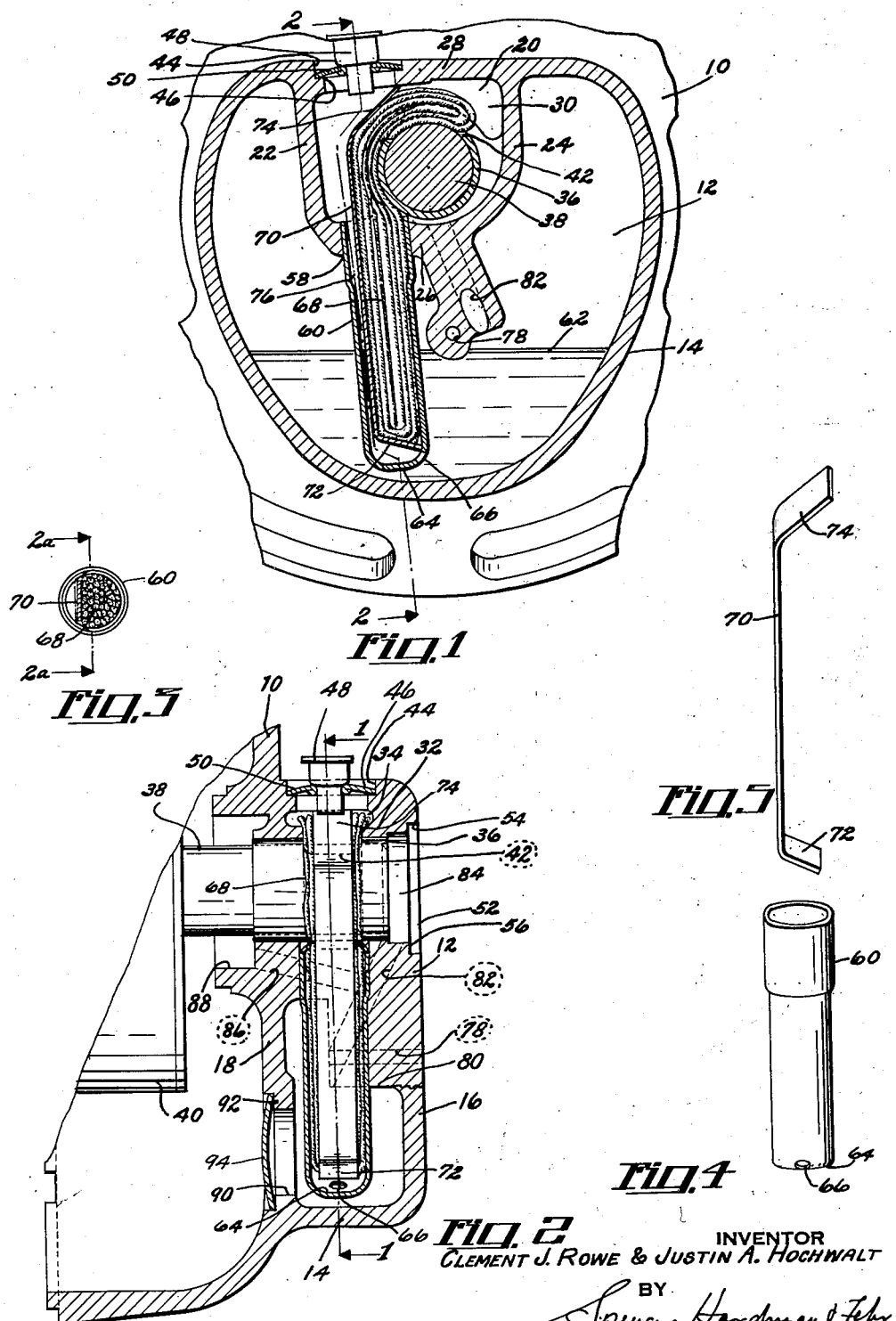

2,057,207

UNITED STATES PATENT OFFICE 2,057,207

LUBRICATOR

Clement J. Rowe and Justin A. Hochwalt, Dayton, Ohio, assignors to General Motors Corporation, Detroit, Mich., a corporation of Delaware Application October 8, 1934, Serial No. 747,285

5 Claims. (Cl. 308—132)

This invention relates to lubricators, and more particularly to lubricators that are adapted to utilize fluid lubricant.

It is among the objects of the present invention to provide a lubricator for lubricating a bearing surface that comprehends a lubricant supply reservoir that accommodates a supply of lubricant sufficient to lubricate the bearing surface for a long period of time, and that is provided with means whereby the addition of lubricant to the reservoir is quickly and easily accomplished.

A further object of this invention is to provide a lubricator having the characteristics described above, and which, in addition, comprehends a lubricant reservoir from which the lubricant does not spill, regardless of the position of the reservoir.

Another object of this invention is to provide a lubricator for lubricating a bearing surface that comprehends a lubricant supply reservoir, an auxiliary reservoir surrounding at least a portion of the bearing surface, means conducting lubricant from the supply reservoir to the portion of the bearing surface within the auxiliary reservoir, and means effecting substantially unimpeded flow of lubricant from the auxiliary reservoir to the supply reservoir.

It will be understood from the following detailed description that the foregoing objects are accomplished by structures such as that illustrated which embody two compartments, one of which contains an ample supply of lubricant for long use and service, a conduit providing communication from the lubricant supply to the other compartment for the passage of lubricant, said conduit being so located in the lubricant compartment that a portion of the conduit is above the lubricant level regardless of the position of the structure, a wick within the conduit for conducting lubricant from the supply to the other compartment, and a partition in the conduit for preventing the wick from substantially impeding the passage of lubricant from the compartment to the supply through the conduit.

Further objects and advantages of the present invention will be apparent from the following description, reference being had to the accompanying drawing wherein a preferred embodiment of the present invention is clearly shown.

In the drawing:

Fig. 1 is a fragmentary view of a device embodying a preferred form of the present invention with a part thereof shown in section; the section being taken substantially on the line 1—1 of Fig. 2 and in the direction of the arrows.

Fig. 2 is a fragmentary sectional view taken substantially on the line 2—2 of Fig. 1, and a portion thereof is taken substantially on the line 2a—2a of Fig. 3, both in the direction of the arrows.

Fig. 3 is an end view of a portion of the preferred structure, with part thereof shown in section.

Figs. 4 and 5 are perspective views of parts of the preferred form of structure.

Referring to the drawing, a member 10, in the present embodiment of the invention, is an end frame of a dynamo-electric machine. The present invention, of course, is not limited to such an application, although well fitted thereto and conveniently illustrated in such an adaptation. Preferably integrally formed with the member 10 is a lubricant supply reservoir 12 that is defined by a curved side wall 14, an end wall 16 and an inner wall 18. An auxiliary chamber or compartment 20 is provided adjacent the lubricant supply reservoir 12, and is defined by walls 22, 24, 26 and 28 that are also preferably integral with the member 10. The inner surface of the walls 24, 26 and 28 is so shaped that inwardly projecting portions such as 30 and 32 are provided, which inwardly projecting portions define a channel 34 therebetween.

A bearing is mounted in the opening that is defined by the inwardly projecting portions 30 and 32, so that the channel 34 encircles the bearing. A shaft 38, that is illustrated as having a dynamo-electric machine rotor 40 mounted thereon, is journaled in the bearing 36. The bearing 36 has an opening 42 therethrough that communicates with the channel 34 to provide lubricant communication from the channel 34 to the bearing surfaces of the bearing 36 and shaft 38. The wall 28 has an opening 44 therethrough, and provides a shoulder portion 46 in the opening. An oiler 48 extends through and is secured to a curved washer 50, which washer, in turn fits into the opening 44 so that it rests against the shoulder 46 to hold the oiler in place. A disc or plate 52 is pressed into an opening 54 so that it rests against a shoulder 56, so that it covers the end of the shaft 38 and is spaced therefrom.

An opening 58 is provided in the wall 26 intermediate the compartment 20 and the lubricant supply reservoir 12. A conduit 60 has one end pressed into the opening 58, and projects into the lubricant supply reservoir 12, preferably to a point near the wall 14, which point is below the normal lubricant level in the reservoir; this lubricant level being substantially that indicated at 62.

The conduit 60 is preferably an elongated cup-shaped member that is open at one end and has a bottom portion 64. An opening 66 is provided in the conduit, and is preferably near the bottom thereof, and preferably to one side of the center of the conduit, since the conduit is preferably mounted to one side of the center of the lubricant supply reservoir, as viewed in Fig. 1. A wick 68 is disposed within the conduit, and extends from near the bottom of the conduit to a point such that it overlaps the opening 42 in the bearing 36. A portion of the wick extends through the opening 42 and contacts the surface of the shaft 38. The wick 68 is preferably made of a plurality of strands of absorbent material such as cotton or wool. A member 70, preferably in the form of a strip, and preferably made of bendable material such as metal, is mounted in the conduit 60 and projects from the end thereof into the compartment 20. This strip 70 confines the wick 68 to a portion of the space within the conduit 60, and preferably has a portion 72 at one end thereof that prevents the wick 68 from going to the bottom of the conduit 60 and from covering the opening 66. A portion 74 at the other end of the member 70 is preferably bent so that it engages the wall 28 to hold the member in position and prevent it from rattling or vibrating; the portion 74 also holding the wick in position against the shaft 38. It is easily understood that by confining the wick to a portion of the inside of the conduit 60, a passage 76 is provided through which a substantially unimpeded flow of lubricant from the compartment 20 to the lubricant supply reservoir is facilitated. This feature aids in the quick and easy introduction of additional lubricant into the reservoir, and provides a drain for the excess lubricant in the compartment 20.

An opening 78 is provided in the wall 16 of the lubricant supply reservoir, and is preferably located at or near the volumetric center of the lubricant supply reservoir, as viewed in Fig. 1. Also, the wall 16 is preferably thicker at 80, surrounding the opening 78. In fact, the portion 80 is preferably thick enough that it extends inwardly to a point near or beyond the volumetric center line of the lubricant supply reservoir, as viewed in Fig. 2. A passage 82 is provided in the wall 16 and extends from the space 84 intermediate the end of the shaft 38 and the plate 52, to the lubricant supply reservoir. A passage 86 in the wall 18 extends from a recess 88, that surrounds the shaft 38 at the end of the bearing 36 opposite the space 84, to the passage 82. The passage 82 serves as a vent and also to conduct lubricant from the space 84 to the lubricant supply reservoir; while the passage 86 conducts lubricant from the recess 88 to the passage 82, and thus to the lubricant supply reservoir. The end of the passage 82 that opens into the lubricant supply reservoir is preferably on substantially the same plane as the similar end of the passage 78. An opening 90 is provided in the wall 18, and a recessed portion in the wall provides a shoulder 92 surrounding the opening. A disc or plate 94 fits into the recessed portion and rests against the shoulder 92 to provide a cover and seal for the opening, which cover is removable to clean the lubricant supply reservoir.

From the foregoing description, it is quite apparent that the lubricant reservoir is so shaped, and the lubricant reservoir 12, auxiliary compartment 20, and the conduit 60 are so constructed and arranged that with a predetermined maximum lubricant level within the reservoir, the lubricant will not spill from the reservoir regardless of the position of the structure. The opening or passage 78 is provided to prevent the lubricant level in the reservoir 12 from being too high. That is, if an excessive amount of lubricant is put into the reservoir, the excess will drain therefrom through the passage 78. However, with a normal or predetermined maximum lubricant level within the reservoir, the lubricant will not spill from the reservoir when it is tipped to different positions, because the inner end of the passage 78 is so situated that upon such tipping in a direction that would effect such spilling, it remains above that normal or predetermined or maximum lubricant level. The passages 82 and 86 are so arranged that they permit lubricant to drain back into the reservoir from the bearing surfaces, but since the opening of the passage 82 into the reservoir is similarly situated to that of the passage 78, the prevention of spilling of lubricant through those passages is similarly effected. The location of the opening 66 and the conduit 60, and the provision of sufficient space in the compartment 20 to retain the lubricant that is normally within the conduit 60, prevents the spilling of lubricant from the reservoir when the reservoir is tipped so that lubricant would tend to spill through the conduit.

Other than the above mentioned advantages, the instant structure permits the addition of lubricant to the reservoir without waiting for that lubricant to soak through, or be absorbed in some wick or absorbent material. The member 70 confines the wick 68 to a portion of the conduit so that lubricant that is introduced through the oiler 48 flows to the lubricant reservoir without being substantially impeded. The member 70 also serves the additional purpose of holding the wick against the surface of the shaft. This insures the lubrication of the shaft as long as the proper lubricant level is maintained. In order to prevent the member 70 from rattling or getting out of place, it preferably longitudinally engages the wall of the conduit 60 and has a portion 72 that is bent so as to tend to hold the member against the conduit wall, as well as to space it from the bottom. Then, the other end engages the wall 28 to prevent longitudinal movement of the member.

From the foregoing description of the structure and mode of operation of this lubricator, it is apparent that in one aspect of the invention the structure comprises chiefly two compartments 12 and 20, one (12) of which contains a supply of lubricant 62, a conduit 60 providing the sole communication from the lubricant supply 62 to the other compartment 20, said conduit 60 being so located in the lubricant compartment 12 that a portion of the conduit 60 is above the lubricant level regardless of the position of the structure, a wick 68 within the conduit 60 for conducting lubricant from the supply 62 to said other compartment 20, and a partition 70 in the conduit 60 for preventing the wick 68 from substantially impeding the passage of lubricant from the compartment 20 to the supply through the conduit 60.

Among the advantages of this lubricator is the following:

The lubricator is not only constructed to contain an ample supply of lubricant for long service, to continually supply lubricant to the surface to be lubricated and to prevent spilling of the lubricant due to tipping, but also provides substantially unimpeded flow of lubricant from a simple filling oiler to the lubricant chamber and return flow from the lubricated surface to the lubricant chamber.

While the embodiment of the present invention as herein disclosed, constitutes a preferred form, it is to be understood that other forms might be adopted, all coming within the scope of the claims which follow.

What is claimed is as follows:

1. In combination with a device having a surface to be lubricated, a lubricant supply reservoir having a supply of lubricant therein, walls providing a compartment adjacent the reservoir, one of the walls having an opening therein, said compartment surrounding at least a portion of said surface, a conduit mounted in said opening and projecting into the reservoir, a wick within the conduit for conducting lubricant from the reservoir to said surface, and a member within the conduit to confine the wick to a portion of the space within the conduit, said member being held in position at one end by the conduit, and the other end of said member abutting one of said walls to prevent movement of the member.

2. In combination with a device having a surface to be lubricated, a lubricant supply reservoir having a supply of lubricant therein, walls providing a compartment adjacent the reservoir, one of the walls having an opening therein, said compartment surrounding at least a portion of said surface, a conduit mounted in said opening and projecting into the reservoir, a wick within the conduit for conducting lubricant from the reservoir to said surface, and a member within the conduit to confine the wick to a portion of the space within the conduit, said member having a portion at one end bent so that the member is held in position within the conduit, and the other end of said member having a portion bent to engage one of said walls so that it holds the wick against said surface.

3. In a lubricating device including two compartments, one of which contains a supply of lubricant, the combination comprehending a conduit providing the sole communication from the lubricant supply to the other compartment, said conduit being so located in the lubricant compartment that a portion of the conduit is above the lubricant level regardless of the position of the device, a wick within the conduit for conducting lubricant from the supply to said other compartment, and a metal strip partition in the conduit for preventing the wick from substantially impeding the passage of lubricant from the compartment to the supply through the conduit.

4. In a lubricating device for a bearing including a main compartment which contains a supply of lubricant and a secondary compartment that surrounds at least a portion of the bearing, the combination of a conduit providing the sole communication from the lubricant supply to the secondary compartment, said conduit being so located in the lubricant compartment that a portion of the conduit is above the lubricant level regardless of the position of the device, a wick within the conduit for conducting lubricant from the supply to the bearing and a partition within the conduit for confining the wick to one side of the conduit to provide a substantially open lubricant passage within the conduit for the flow of lubricant from the secondary compartment to the main compartment.

5. In a lubricating device, the combination comprehending two compartments, one of which contains a supply of lubricant and the other of which includes an extension having an orifice that provides the sole communication from the lubricant supply to said other compartment, said orifice being so located as to be in the supply only until the device assumes a position in which lubricant from the supply tends to gravitate through the extension into said other compartment, means within the extension for conducting lubricant from the supply to said other compartment, and a partition comprising a metal strip in the extension for preventing the last mentioned means from substantially impeding the passage of lubricant from said other compartment to the lubricant supply through the extension.

CLEMENT J. ROWE.
JUSTIN A. HOCHWALT.